United States Patent
Anderson

(10) Patent No.: US 7,222,004 B2
(45) Date of Patent: May 22, 2007

(54) VEHICULAR NAVIGATION WITH LOCATION-BASED NOISE REDUCTION

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 150 days.

(21) Appl. No.: 11/049,131

(22) Filed: Feb. 2, 2005

(65) Prior Publication Data

US 2006/0173593 A1  Aug. 3, 2006

(51) Int. Cl.
*G06F 17/00* (2006.01)
*B60K 1/00* (2006.01)

(52) U.S. Cl. ................... 701/22; 701/207; 180/65.2
(58) Field of Classification Search ............. None
See application file for complete search history.

(56) References Cited

U.S. PATENT DOCUMENTS

| | | | |
|---|---|---|---|
| 5,815,824 A | 9/1998 | Saga et al. ............ | 701/22 |
| 6,098,734 A * | 8/2000 | Kawamura ............ | 180/65.2 |
| 6,814,170 B2 * | 11/2004 | Abe et al. ............ | 180/65.2 |
| 2002/0065607 A1 | 5/2002 | Kunzeman et al. ..... | 701/213 |
| 2004/0039517 A1 | 2/2004 | Biesinger et al. ..... | 701/117 |
| 2005/0251299 A1* | 11/2005 | Donnelly et al. ...... | 701/19 |

FOREIGN PATENT DOCUMENTS

| | | |
|---|---|---|
| EP | 0 811 523 A1 | 12/1997 |
| EP | 1 369 015 A1 | 12/2003 |
| JP | 10 232137 | 9/1998 |

OTHER PUBLICATIONS

Kimberly Schillcutt; Solar Based Navigation for Robotic Explorers [online], [retrieved Feb. 2, 2005 ]. Retrieved from the Internet <URL:http://www.ri.cmu.edu/pub_files/pub2/shillcutt_kim_2000_2/shillcutt_kim_2000_2.pdf>.

* cited by examiner

*Primary Examiner*—Michael J. Zanelli

(57) ABSTRACT

A method or system for managing the noise level of a vehicle establishes one or more noise sensitive zones in a work area. A present location is determined for a corresponding vehicle in the work area. A charge level is measured. The charge level pertains charge level of an energy storage device of the vehicle. A mode of operation of the vehicle is selected based on the determined present location of the vehicle, the established noise sensitive zones, and the measured charge level. The mode of operation is selected from a quiet mode and a charging mode, or the equivalent of either.

24 Claims, 5 Drawing Sheets

VEHICULAR NAVIGATION WITH LOCATION-BASED NOISE REDUCTION

FIELD OF THE INVENTION

This invention relates to vehicular navigation with location-based noise reduction.

BACKGROUND OF THE INVENTION

Hybrid vehicles may be powered by an internal combustion engine or by one or more electric motors. The internal combustion engine produces noise from the ignition and combustion of fuel, among other things. Although mufflers reduce the level of noise emanating from an exhaust system, even the reduced level of noise may exceed requisite noise levels for one or more of the following applications: mowers operating in residential areas, mowers operating on golf courses near golfers or guests, all-terrain vehicles (ATV's) in nature preserves or parks, military vehicles operating in a stealth mode, transportation or commercial vehicles in urban settings, vehicles used indoors at airports or in warehouses. Accordingly, there is a need to control or manage the noise reduction of a vehicle based on its location.

SUMMARY OF THE INVENTION

In accordance with one embodiment of the invention, a method or system for managing the noise level of a vehicle establishes one or more noise sensitive zones in a work area. A present location is determined for a corresponding vehicle in the work area. A charge level is measured. The charge level pertains to an energy storage device of the vehicle. A mode of operation of the vehicle is selected based on the determined present location of the vehicle, the established noise sensitive zones, and the measured charge level. The mode of operation is selected from a quiet mode and a charging mode, or the equivalent of either.

DESCRIPTION OF THE PREFERRED EMBODIMENT

Figure 1:
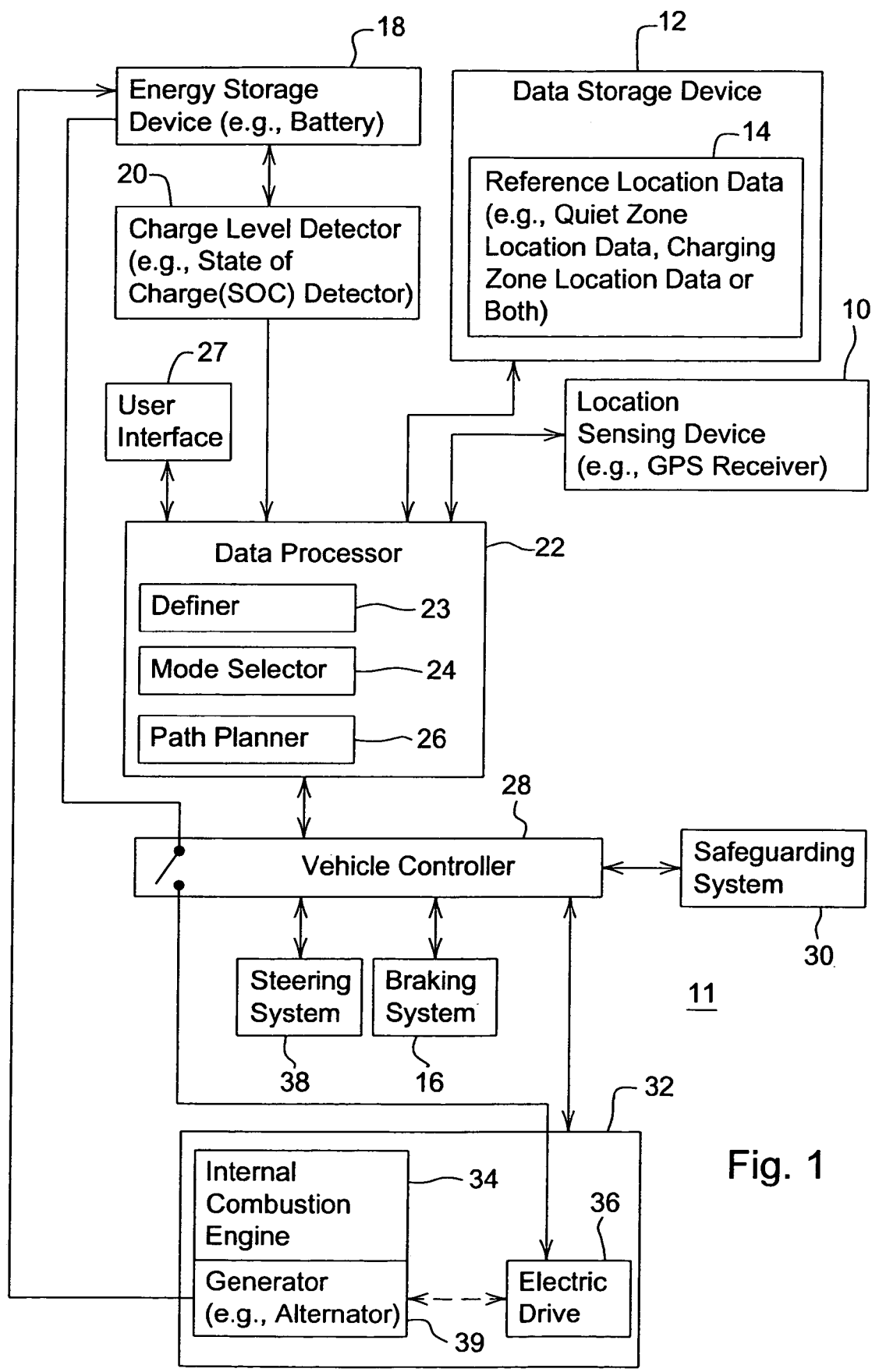
FIG. 1 is a block diagram of one embodiment of a system for managing the noise level of a vehicle.

In accordance with one embodiment, FIG. 1 illustrates a noise management system 11 for managing the noise level of the vehicular noise emission produced by vehicle on the basis of vehicular location. The noise management system 11 comprises a data processor 22 that communicates with a location-sensing device 10, charge level detector 20, a data storage device 12, a user interface 27, and a vehicular controller 28. In turn, the vehicular controller may communicate with a braking system 16, a steering system 38, a safeguarding system 30, and a propulsion system 32 of the vehicle.

The propulsion system 32 of the vehicle may comprise an internal combustion engine 34 and an electric drive 36. The propulsion system 32 may drive tracks or wheels associated with the vehicle. The internal combustion engine 34, the electric drive 36, or both may be mechanically coupled (e.g., directly or indirectly) to the wheels or tracks of the vehicle for propulsion of the vehicle.

The internal combustion engine 34 may incorporate or be associated with a generator 39 for generating electrical energy. For example, the generator 39 may comprise a generator or an alternator rotationally coupled (e.g., via a belt or chain) to rotational shaft of the internal combustion engine 34. The generator 39 is electrically connected or coupled to an energy storage device 18 for charging of the energy storage device 18. The internal combustion engine 34 applies rotational energy to the generator 39 in the charging mode.

The energy storage device 18 may comprise an energy source or one or more batteries for providing stored electrical energy to the electric drive 36 of the propulsion system 32. If the storage device 18 comprises a battery, the battery recharging characteristics and depletion characteristics may vary with operating conditions, ambient temperature, battery construction, and battery age.

The charge level detector 20 measures a charge level of an energy storage device 18 of the vehicle. The charge level detector 20 may report, transmit or otherwise communicate the detected charge level (e.g., state of charge) of the energy storage device 18 to the data processor 22. If the energy storage device 18 is a battery, the state of charge of the battery may be derived through measurement of the battery voltage, ambient temperature or battery temperature, current, and battery conductance or battery resistance from time to time (e.g., at regular intervals). The state of charge may be expressed as the stored energy that is available as percentage of the design capacity or peak energy level of the battery.

The data processor 22 comprises a definer 23, a mode selector 24 and a path planner 26. The definer 23 establishes one or more noise sensitive zones in a work area. The mode selector 24 selects a mode of operation of the vehicle based on the determined present location of the vehicle, the established noise sensitive zones, and the measured charge level. The mode of operation is selected from a quiet mode and a charging mode, for example. The path planner 26 may determine a path plan of the vehicle consistent with a mode selection process of the mode selector 24 and established noise sensitive zones within the work area.

In an alternate embodiment, the path planner 26 may determine a path plan of the vehicle consistent with a mode selection process of the mode selector, established noise sensitive zones with the work area, and noise insensitive zones within the work area.

The location-sensing device 10 may comprise one or more of the following: a location-determining receiver, a Global Positioning System (GPS) receiver with differential correction, an inertial guidance sensor, an accelerometer, a gyroscope, a wheel sensor, an odometer, and a compass. A Global Positioning System (GPS) receiver with differential correction represents an illustrative example of a location-determining receiver. The location-sensing device 10 determines a present location of a corresponding vehicle in the work area.

The user interface 27 may comprise a keyboard, keypad, a display, a pointing device (e.g., mouse, trackball), a magnetic disc drive, a magnetic tape drive, an optical disc, a data port (e.g., parallel, serial or a Universal Serial Bus (USB) port), or another mechanism for inputting or entering input data into the data processor 22. The user interface 27 may support the communication or input of data via a physical media, such as a memory card, a floppy disc, or via a wireless interface such as Bluetooth, and 802.11g. The user interface 27 supports a user's entry or input of location data (e.g., a group of two or three dimensional coordinates) indicating the boundaries of one or more noise sensitive zones, noise tolerant zones, or other reference location data 14. Noise tolerant zones may also be referred to as noise insensitive zones and the terms shall be interchangeable as described herein. Reference location data 14 may comprise quiet zone location data, charging zone location data, internal combustion zone active location data, electric mode location, stealth mode location data, or the like.

The data processor 22 uses the present vehicle location to reference a map or reference location data 14 in the data storage device 12 that identifies quiet zones. In the quiet zones under one embodiment, only battery power may be used and the internal combustion engine 34 may be shut off to reduce noise. Under another embodiment, the data processor 22 may limit other vehicle parameters such as the speed (e.g., revolutions per time unit or revolutions per minute) of a rotating member (e.g., crank shaft) or the vehicle component or attached work tool to meet noise requirements associated with a particular location.

Figure 2:
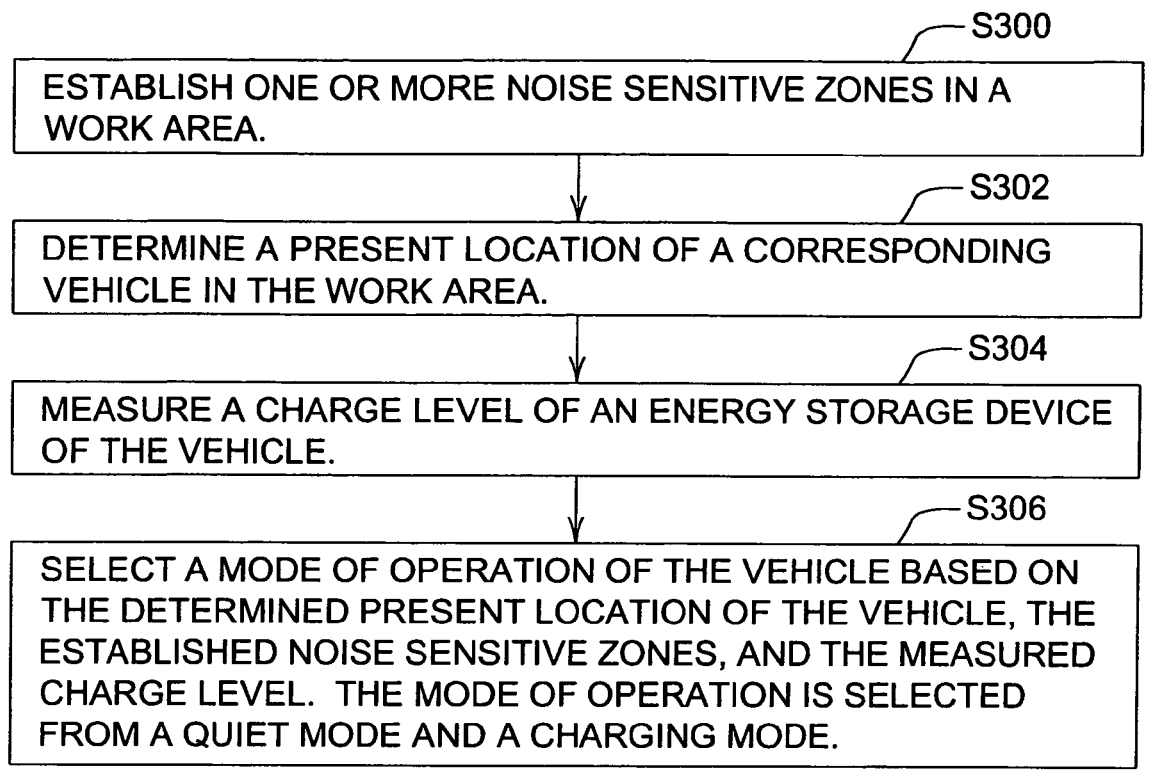
FIG. 2 is an example of a method for managing the noise level of a vehicle.

FIG. 2 is a flow chart of a method for managing the noise level produced by a vehicle. The method of FIG. 2 begins with step S300.

In step S300, one or more noise sensitive zones are established in a work area. For example, the definer 23 or data processor 22 establishes location data for the boundaries of one or more noise sensitive zones in the work area. A user may use the user interface 27 to input or enter noise sensitive zones. The user may define or classify the noise sensitive zones based on one or more of the following factors, among other considerations: air temperature, pressure and humidity that impact how well sound propagates; ground topography that tends to block or channel sound with respect to a particular location; location of vegetation that tends to absorb sound and the degree of the vegetation present during a particular season or time of year; noise compliant histories around a particular area; event calendars for adjacent park band shells, tee times, sports game times, wildlife mating season, and weekend versus weekday for likely resident sleeping times. Noise sensitive or quiet zones may be determined by identifying sensitive locations such as the presence of homes, businesses, recreational or wildlife nesting areas, and then creating a quiet zone some radius from these points. The noise sensitive zones entered or inputted may be stored as reference location data.

In one illustrative example, the noise sensitive zones may be compiled into a map for storage in the data storage device 12. The map may be generated on-board the vehicle via the user interface 27 and the definer 23 or off-board and then communicated to the vehicle via the user interface 27. In one example, the map has a binary state representation (e.g., a binary state cellular matrix or single layer) indicating where noise levels should be reduced or capped at a maximum benchmark noise level. The reference location data 14 or map in the data storage device 12 may have coordinates (e.g., real world, two dimensional or three dimensional coordinates), cells, matrix positions associated with corresponding symbols, text, bits, bytes or words that indicate a first state (e.g., "Yes" or "1") where respective location is a quiet zone and a second state (e.g., "No" or "0") where the respective location is not a quiet zone.

In another example, the map has a multi-state representation (e.g., a multi-dimensional matrix) of acceptable sound levels versus location data. Accordingly, rather than establishing a single noise sensitive zone, multiple noise sensitive zones (or multiple classes of noise sensitive zones) with corresponding noise level ranges or noise level maximum values may be established. For instance, three types of noise sensitive zones may correspond to a first noise sensitive zone (e.g., associated with a corresponding first noise level range), a second noise level zone (e.g., associated with a corresponding second noise level range), and a third noise level zone (e.g., associated with a corresponding third noise level range), where the first noise level range is a quiet state, the second noise level range is a quieter state, and the third noise level range is the quietest state.

In step S302, a location-sensing device 10 or location determining receiver determines a present location of a corresponding vehicle in the work area. For example, the location sensing device 10 may determine two dimensional or three dimensional coordinates for the vehicle. In one example, the present location of the vehicle may be associated with a corresponding cell (e.g., a cell identifier) of a map (e.g., a binary state representation or multi-state representation for subsequent processing by the data processor 22).

In step S304, a charge level detector 20 (e.g., state of charge detector) measures a charge level of an energy storage device 18 of the vehicle. For example, the charge level detector 20 measures a charge level or a state-of-charge measurement of a battery as the energy storage device 18. A charge level may be defined as the available energy capacity (e.g., in Amp*Hours) of the energy storage device 18. The available energy capacity may be specified as a ratio or percentage of the design energy capacity for the energy storage device 18 or a peak energy capacity for the corresponding energy storage device 18.

In step S306, a mode selector 24 or data processor 22 selects a mode of operation of the vehicle based on the determined present location of the vehicle, the established noise sensitive zone or zones, and the measured charge level. The mode of operation may be selected from a quiet mode and a charging mode. In the quiet mode, the internal combustion engine 34 is off or running at a sufficiently low revolutions-per-time (e.g., revolutions per minute) of the engine shaft (e.g., crankshaft) such that a noise output of the vehicle is less than or equal to a maximum noise level criteria. For example, the internal combustion engine 34 may be permitted to operate at a low idle condition during the quiet mode or may be turned off altogether. In the quiet mode, the drive motor or electric motor is used to propel the vehicle. Stored electrical energy from the energy storage device 18 may be used during the quiet mode. The quiet mode may also be referred to as the stealth mode, the silent mode, and the electrical propulsion mode. Further, the quiet mode may comprise the internal combustion engine inactive mode or the internal combustion engine idle mode.

In the charging mode, the internal combustion engine 34 is on and may be running at any suitable level for charging of the energy storage device 18 (e.g., batteries). During the charging mode, the vehicle may be propelled by the internal combustion engine 34, the drive motor, or both. The charging mode may be referred to as the loud mode, internal combustion propulsion mode, the internal combustion active mode, or the like.

In one embodiment, the mode selector 24 or data processor 22 may record the position (e.g., coordinates) of the vehicle, a time stamp, and its mode of operation for noise compliance records or maintenance records.

Step S306 may be carried out in accordance with various techniques, that may be applied separately or cumulatively. Under a first technique, the mode selector 24 selects the charging mode if the present location of the vehicle falls outside of the noise sensitive zones. Under the second technique, the mode selector 24 selects the quiet mode if the charge level meets or exceeds a threshold level and the present location of the vehicle falls within one of the noise sensitive zones. Under the third technique, the mode selector 24 selects the quiet mode until the charge level reaches or falls below the threshold level. Under the fourth technique, the mode selector 24 selects the quiet mode for the noise sensitive zone, subject to directing the vehicle outside of the noise sensitive zone if the charge level (e.g., state of charge) of the energy storage device 18 does not meet or exceed a minimum threshold level. Under the fifth technique, the mode selector 24 selects the quiet mode for the vehicle in a noise-sensitive zone, subject to directing a vehicle outside of the noise sensitive zone in accordance with an expiration of a time period if the energy storage device 18 does not meet or exceed a certain minimum threshold level. Under a sixth technique, the mode selector 24 selects the quiet mode for the noise sensitive zone, subject to directing a vehicle outside of the noise sensitive zone in accordance with at least one of a shortest path, a quickest path, and a path having the lowest energy consumption if the charge level (e.g., state of charge) of the energy storage device 18 does not meet or exceed the threshold level. Under a seventh technique, the mode selector 24 selects the quiet mode for the noise sensitive zone, subject to directing a vehicle outside of the noise sensitive zone in accordance with at least one of an aesthetic path of the vehicle if the charge level (e.g., state of charge) of the energy storage device 18 does not meet or exceed the threshold level. The aesthetic path may comprise completing a row in progress until the end of the row, prior to directing the vehicle outside of the noise sensitive zone. Under an eighth technique, a microphone 40 measures a vehicular noise emission level of a vehicle and the data processor 22 controls an operation of the vehicle in the selected mode based on the vehicular noise emission level by one or more of the following activities: turning off an internal combustion engine and limiting a maximum revolution per time unit of a shaft of the internal combustion engine. Under a ninth technique, the audio interface 42 provides feedback data or a feedback signal (e.g., the measured vehicular noise emission level or a derivative thereof) to the data processor 22 or the selector 24 such that a vehicular noise emission level may be controlled to be less than a maximum vehicular noise emission level in the noise sensitive zone by one or more of the following activities: turning off an internal combustion engine and limiting a maximum revolution per time unit of a shaft of the internal combustion engine.

Figure 3:
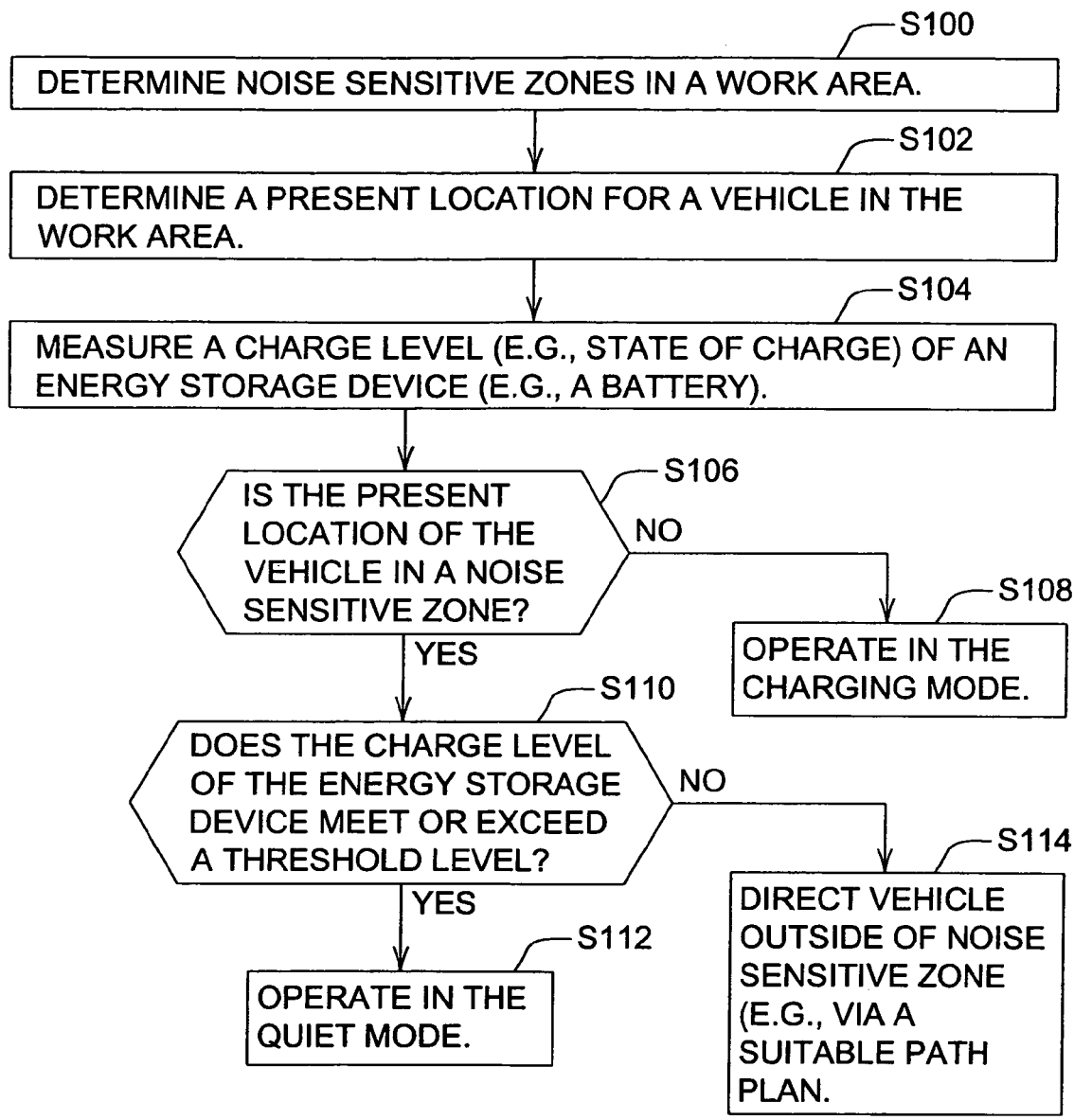
FIG. 3 is another example of a method for managing the noise level of a vehicle.

FIG. 3 is a method for managing the noise level produced by a vehicle. The method of FIG. 3 begins with step S100.

In step S100, a definer 23 or user interface 27 supports the determination of one or more noise sensitive zones in a work area. For example, the definer 23 determines noise sensitive zones in a work area in accordance with user preferences. In one embodiment, each noise sensitive zone is an area where the noise emitted by the vehicle is less than or equal to a maximum noise level. In another embodiment, each noise sensitive zone is associated with a corresponding different maximum noise level or a corresponding different range of noise levels.

In step S102, a location-sensing device 10 determines a present location for a vehicle in the work area. For example, a location-determining receiver or Global Positioning System (GPS) receiver determines a present location (e.g., two or three dimensional coordinates) for a vehicle in the work area.

In step S104, a charge level detector 20 measures a charge level (e.g., state of charge) of an energy storage device 18 (e.g., battery). The charge level may indicate an available energy capacity of the energy storage device 18. For example, the charge level may indicate the available energy capacity of the energy storage device 18 as a ratio or percentage of peak energy storage capacity or design energy storage capacity for the particular corresponding energy storage device 18.

In step S106, the data processor 22 determines whether the present location of the vehicle is within the noise sensitive zone or not. If the present location of the vehicle is in the noise sensitive zone, the method continues with step S110. However, if the present location of the vehicle is outside the noise sensitive zone, the method continues with step S108.

The noise sensitive zone may be defined as a series of points (e.g., two or three dimensional coordinates) that fall on a boundary of the noise sensitive zone or within the noise sensitive zone. Alternately, the present location and noise sensitive zones may be expressed and compared as cells, where the work area is divided into cells (e.g., rectangular cells, square cells, or polygonal cells).

In step S108, the mode selector 24 or data processor 22 commands the vehicle controller 28 to operate the vehicle in the charging mode. The vehicle controller 28 or mode selector 24 may implement the charging mode in accordance with any of the following techniques, that may be applied alternatively and cumulatively. Under a first technique, the mode selector 24 or vehicular controller operates with the internal combustion engine 34 on. Under a second technique, the mode selector 24 or vehicular controller operates with the internal combustion engine 34 on and operating within a certain range of revolutions per time unit (e.g., revolutions per minute).

In step S110, the charge level detector 20 or the data processor 22 determines whether the charge level of the energy storage device 18 meets or exceeds a threshold level. If the charge level meets or exceeds a threshold level, the method continues with step S112. However, if the charge level does not meet or exceed the threshold level, the method continues with step S114.

In step S112, the mode selector 24 or vehicle controller 28 operates the vehicle in the quiet mode. The vehicle controller 28 or mode selector 24 may implement the quiet mode in accordance with any of the following techniques, which may be applied alternatively and cumulatively. Under a first technique, the quiet mode consists of the internal combustion engine 34 being turned off or not running and the vehicle propulsion occurring via the electric drive 36. Under a second technique, the quiet mode consists of the internal combustion engine 34 being limited to a maximum revolution per time unit (revolutions per minute) of the crankshaft. For instance, the maximum revolutions per time unit may be consistent with an idle engine speed or measured vehicular noise emission level falling below a corresponding established maximum noise level. The vehicular noise emission level includes contributions from the vehicle's exhaust system and internal combustion engine 34. In the second technique, the electric drive 36 may propel the vehicle, while the internal combustion engine 34 (e.g., limited to an idle range or lower revolution per unit time range) provides electrical energy for charging the energy storage device 18 via the generator 39. Under a third technique, the quiet mode consists of the vehicle propulsion occurring via the electric drive 36 and the internal combustion engine 34 being turned off or not running, except where the charge level of the energy storage device 18 drops below a lower threshold level. The lower threshold level may be set to avoid stranding the vehicle in a quiet zone or to avoid the prohibition of operating the vehicle in the full charging mode or loud mode in a quiet zone, where the energy in the energy storage device 18 is depleted.

In step S114, the path planner 26 or vehicle controller 28 directs the vehicle outside of the noise sensitive zone (e.g., via a suitable path plan.) Because the vehicle cannot run indefinitely on stored energy in the energy storage device 18 (e.g., batteries), the path planner 26 instructs the vehicle to leave a quiet zone for a time so that internal combustion engine 34 in combination with its generator 39 can recharge the energy storage device 18.

In executing step S114, the path planner 26 may first determine a list of non-sensitive zones that are in proximity (e.g., within a predetermined maximum radius) to the present location of the vehicle in the noise sensitive or quiet zone. Second, the closest edge of each non-sensitive zone is determined based on a direct straight line path estimate (e.g., radial path estimate) between the present location and each corresponding non-sensitive zone. Third, the path planner 26 selects a preferential non-sensitive zone which is associated with the preferential path (e.g., shortest path, quickest path, or lowest energy consumption path) between the present vehicle location and the closest edge. The preferential plan may consider obstacles or objects that intervene or obstruct what otherwise would be a straight-line path from the present vehicle location to a point (e.g., closest point) within the non-sensitive zone. Finally, the path planner 26 may execute the preferential path plan (e.g., shortest path plan) from the present location to a point lying in the preferential non-sensitive zone on the closest edge. The preferential path plan may be displayed to an operator that steers the vehicle to adhere to the path plan or the path plan may be used directly to control a vehicle, which is unmanned or autonomous.

Figure 4:
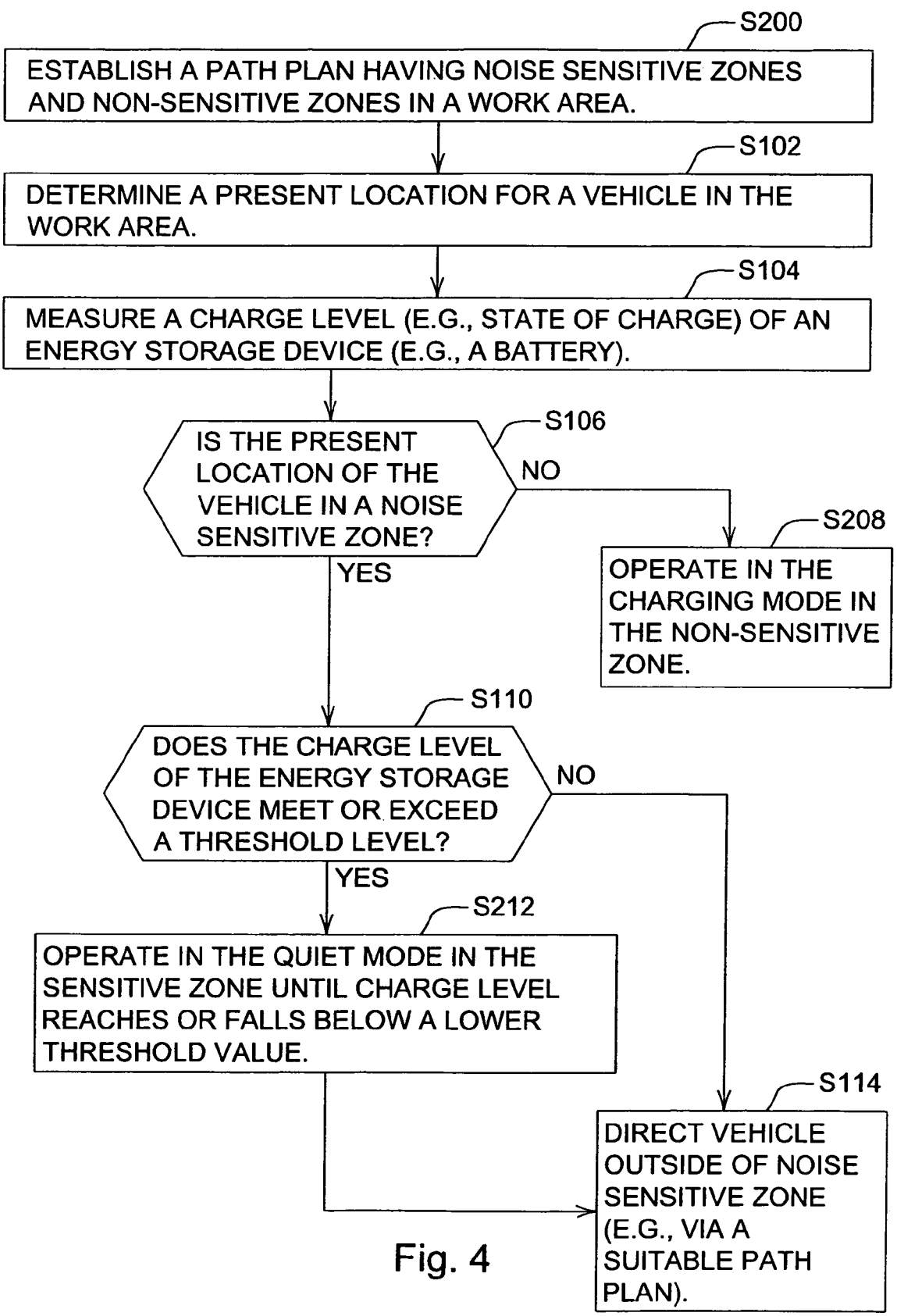
FIG. 4 is yet another example of a method for managing the noise level of a vehicle.

The method of FIG. 4 is similar to the method of FIG. 3, except the method of FIG. 4 replaces step S100 with step S200, step S108 with step S208, and step S112 with step S212, respectively. Like reference numbers indicate like steps or procedures in FIG. 3 and FIG. 4.

In step S200, a definer 23 or data processor 22 establishes a path plan having noise sensitive zones and non-sensitive zones in a work area. Noise sensitive zones and non-sensitive zones may be defined in accordance with a series of geographic coordinates (e.g., two dimensional or three dimensional points) that define the location of points that lie on a boundary of a zone. A noise sensitive zone is an area where a vehicular nose emission falls below a defined maximum threshold level. A noise insensitive zone is an area where the vehicular noise emission exceeds the defined maximum threshold level, with or without an upper limit of vehicular noise emissions.

In step S102, a location-sensing device 10 determines a present location for a vehicle in the work area. For example, a location-determining receiver or GPS receiver determines a present location for a vehicle in the work area.

In step S104, a charge level detector 20 measures a charge level (e.g., state of charge) of an energy storage device 18 (e.g., battery).

In step S106, the data processor 22 determines whether the present location of the vehicle is within the noise sensitive zone or not. If the present location of the vehicle is in the noise sensitive zone, the method continues with step S110. However, if the present location of the vehicle is outside the noise sensitive zone, the method continues with step S208.

In step S208, the mode selector 24 or vehicle controller 28 operates the vehicle in the charging mode in the non-sensitive zone.

In step S110, the charge level detector 20 or the data processor 22 determines whether the charge level of the energy storage device 18 meets or exceeds a threshold level. If the charge level meets or exceeds a threshold level, the method continues with step S212. However, if the charge level does not meet or exceed the threshold level, the method continues with step S114.

In step S212, the mode selector 24 or vehicle controller 28 operates the vehicle in the quiet mode in the sensitive zone until the charge level reaches or falls below a lower threshold value. Advantageously, the energy storage device 18 (e.g., batteries) are not run down excessively in the quiet mode in a noise sensitive area because if the charge level reaches or falls below the lower threshold value, the method continues with step S114.

In an alternate embodiment for carrying out step S212, the lower threshold value of the charge level may be replaced or supplemented by a duration of operation of the vehicle in the quiet mode. Accordingly, the mode selector 24 or vehicle controller 28 may only operated the vehicle in the quiet mode in the sensitive zone until both the charge level reaches or falls below a lower threshold value and until a timer expires.

In step S114, the path planner 26 or vehicle controller 28 directs the vehicle outside of the noise sensitive zone (e.g., via a suitable path plan.) After step S114 or once the vehicle reaches outside of the noise sensitive zone or reaches a non-sensitive zone, the vehicle controller 28 may direct the vehicle to enter the charging mode. Accordingly, the charge level of the energy storage device 18 may be restored over an extended period of time by executing and re-executing the method of FIG. 4.

Figure 5:
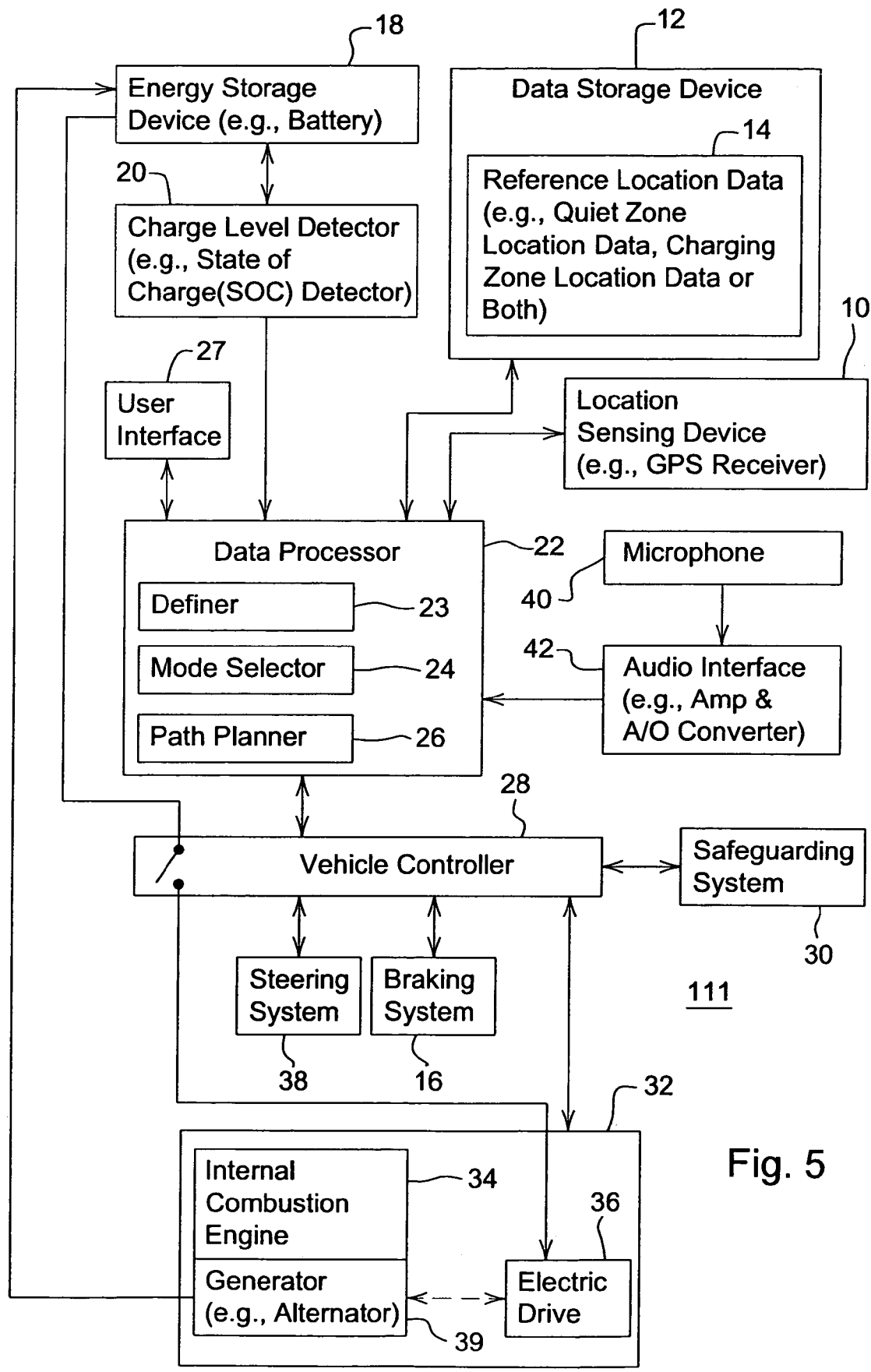
FIG. 5 is a block diagram of another embodiment of a system for managing the noise level of a vehicle.

The management system 111 of FIG. 5 is similar to the management system 11 of FIG. 1, except the management system 11 for FIG. 5 further includes a microphone 40 and an audio interface 42 coupled to the data processor 22. Like reference numbers in FIG. 1 and FIG. 5 indicate like elements.

The microphone 40 is coupled to the audio interface 42. In turn, the audio interface 42 is coupled to the data processor 22. In one example, the audio interface 42 comprises an analog amplifier and an analog-to-digital converter. The microphone 40 and the audio interface 42 may be used to gather feedback on the noise level of the vehicle when operating the noise sensitive zone, for instance. If the vehicle uses the internal combustion engine 34 in the noise sensitive zone limited to some maximum vehicular noise emission level (or revolution per time engine rotational speed corresponding thereto), the microphone 40 and audio interface 42 may provide feedback data or a feedback signal (e.g., the measured vehicular noise emission level or a derivative thereof) to the data processor 22 or mode selector 24 to comply with the vehicular maximum noise emission level. The microphone 40 provides feedback data or a feedback signal to the mode selector 24 such that a vehicular noise emission level may be controlled to be less than a maximum vehicular noise emission level in a noise sensitive zone by one or more of the following activities: turning off an internal combustion engine 34 and limiting a maximum revolution per time unit of a shaft of the internal combustion engine 34. The data processor 22 may use current vehicle sound measurements by the microphone as an input to the decision on whether to use only batteries or the energy storage device 18 for power (as opposed to the internal combustion engine 34 and the energy storage device 18).

The foregoing method and system establishes a practical data management scheme for storing noise sensitive zones, non-sensitive zone, or both in a manner that is independent from the operator's observations, memory, or familiarity with a work area. The system and method is capable of automatically switching from a charging mode to a quiet mode (e.g., stealth mode), or vice versa, without operator intervention or in a manner that is transparent to an operator. The automatic switch from the charging mode to the quiet mode, and vice versa, is well suited for application to unmanned or autonomous vehicles. The method and system automates the enabling and disabling of the quiet mode (e.g., stealth mode) and charging mode in a consistent manner that meets noise abatement goals and maintains the integrity of the energy storage device.

Having described the preferred embodiment, it will become apparent that various modifications can be made without departing from the scope of the invention as defined in the accompanying claims.

The invention claimed is:

1. A method for managing the noise level of a vehicle, the method comprising:
   establishing one or more noise sensitive zones in a work area;
   determining a present location of a corresponding vehicle in the work area;
   measuring a charge level of an energy storage device of the vehicle; and
   selecting a mode of operation of the vehicle based on the determined present location of the vehicle, the established noise sensitive zones, and the measured charge level; the mode of operation being selected from a quiet mode and a charging mode, where the quiet mode comprises operating with an internal combustion turned off, except if the charge level falls below a lower threshold where the quiet mode comprises operating with the internal combustion engine limited to a maximum number of revolutions per unit time.

2. The method according to claim 1 wherein the selecting of the mode selects the charging mode if the present location of the vehicle falls outside of the noise sensitive zones.

3. The method according to claim 1 further selecting of the mode selects the quiet mode if the charge level meets or exceeds a threshold level.

4. The method according to claim 3 further selecting of the mode selects the quiet mode until the charge level reaches or falls below the threshold level.

5. The method according to claim 1 wherein the charge level comprises a state of charge measurement of a battery as the energy storage device.

6. The method according to claim 1 further comprising selecting the quiet mode and directing a vehicle outside of the noise sensitive zone if the charge level of the energy storage device does not meet or exceed the threshold level.

7. The method according to claim 1 further comprising selecting the quiet mode and directing a vehicle outside of the noise sensitive zone in accordance with an expiration of a time period if the charge level of the energy storage device does not meet or exceed the threshold level.

8. The method according to claim 1 further comprising selecting the quiet mode and directing a vehicle outside of the noise sensitive zone in accordance with at least one of a shortest path, a quickest path, and a path having the lowest energy consumption if the charge level of the energy storage device does not meet or exceed the threshold level.

9. The method according to claim 1 further comprising:
   establishing non-sensitive noise zones in the work area; and selecting the charging mode only if the vehicle falls within the non-sensitive noise zone.

10. The method according to claim 1 wherein the establishing of one or more noise sensitive zones comprises designating a maximum vehicular noise level for the noise sensitive zones.

11. The method according to claim 1 wherein the establishing of one or more noise sensitive zones comprises designating a different maximum vehicular noise level for each corresponding noise sensitive zone.

12. The method according to claim 1 further comprising:
    measuring a vehicular noise emission level of a vehicle;
    controlling an operation of the vehicle in the selected mode based on the vehicular noise emission level by one or more of the following activities: turning off an internal combustion engine and limiting a maximum revolution per time unit of a shaft of the internal combustion engine.

13. A system for managing the noise level of a vehicle, the system comprising:
    a definer for establishing one or more noise sensitive zones in a work area;
    a location-sensing device for determining a present location of a corresponding vehicle in the work area;
    a charge level detector for measuring a charge level of an energy storage device of the vehicle; and
    a mode selector for selecting a mode of operation of the vehicle based on the determined present location of the vehicle, the established noise sensitive zones, and the measured charge level; the mode of operation being selected from a quiet mode and a charging mode, where the quiet mode comprises operating with an internal combustion turned off, except if the charge level falls below a lower threshold where the quiet mode comprises operating with the internal combustion engine limited to a maximum number of revolutions per unit time.

14. The system according to claim 13 wherein mode selector selects the charging mode if the present location of the vehicle falls outside of the noise sensitive zones.

15. The system according to claim 13 wherein the mode selector selects the quiet mode if the charge level meets or exceeds a threshold level.

16. The system according to claim 13 wherein the mode selector selects the quiet mode until the charge level reaches or falls below the threshold level.

17. The system according to claim 13 wherein the charge level comprises a state of charge measurement of a battery as the energy storage device.

18. The system according to claim 13 wherein the mode selector selects the quiet mode and directs a vehicle outside of the noise sensitive zone if the charge level of the energy storage device does not meet or exceed the threshold level.

19. The system according to claim 13 wherein the mode selector selects the quiet mode and directs a vehicle outside of the noise sensitive zone in accordance with an expiration of a time period if the charge level of the energy storage device does not meet or exceed the threshold level.

20. The system according to claim 13 wherein the mode selector selects the quiet mode and directs a vehicle outside of the noise sensitive zone in accordance with at least one of a shortest path, a quickest path, and a path having the lowest energy consumption if the charge level of the energy storage device does not meet or exceed the threshold level.

21. The system according to claim 13 wherein the definer establishes non-sensitive noise zones in the work area; and selects the charging mode only if the vehicle falls within one of the non-sensitive noise zones.

22. The system according to claim 21 further comprising:
a generator electrically coupled to the energy storage device for charging the energy storage device; and
an internal combustion engine applying rotational energy to the generator in the charging mode.

23. The system according to claim 21 further comprising:
an alternator electrically coupled to the energy storage device for charging the energy storage device; and
an internal combustion engine applying rotational energy to the alternator in the charging mode.

24. The system according to claim 13 further comprising:
a microphone for providing feedback to the selector such that a vehicular noise emission level may be controlled to be less than a maximum vehicular noise emission level in the noise sensitive zones by any of the following activities: turning off an internal combustion engine and limiting a maximum revolution per time unit of a shaft of the internal combustion engine.

* * * * *